(12) United States Patent
Chen

(10) Patent No.: US 10,337,882 B2
(45) Date of Patent: Jul. 2, 2019

(54) OPTICAL PROJECTION SYSTEM AND DEVICES THEREOF

(71) Applicant: OPTICSER CO., LTD., New Taipei (TW)

(72) Inventor: Ying-Yun Chen, New Taipei (TW)

(73) Assignee: OPTICSER CO., LTD., New Taipei (TW)

( * ) Notice: Subject to any disclaimer, the term of this patent is extended or adjusted under 35 U.S.C. 154(b) by 0 days.

(21) Appl. No.: 15/802,424

(22) Filed: Nov. 2, 2017

(65) Prior Publication Data

US 2019/0128691 A1    May 2, 2019

(51) Int. Cl.
*G02B 27/01* (2006.01)
*G01C 21/36* (2006.01)
*B29D 11/00* (2006.01)

(52) U.S. Cl.
CPC ...... *G01C 21/365* (2013.01); *B29D 11/00596* (2013.01); *G02B 27/0101* (2013.01); *G02B 2027/011* (2013.01); *G02B 2027/014* (2013.01); *G02B 2027/0112* (2013.01); *G02B 2027/0145* (2013.01); *G02B 2027/0187* (2013.01)

(58) Field of Classification Search
CPC ............... G02B 27/01; G02B 27/0101; G02B 2027/013; G02B 2027/0145; G02B 2027/0181; G02B 2027/0196
See application file for complete search history.

(56) References Cited

U.S. PATENT DOCUMENTS

| | | | | |
|---|---|---|---|---|
| 6,359,737 B1* | 3/2002 | Stringfellow | ...... | G02B 27/0101 250/214 VT |
| 8,736,964 B2* | 5/2014 | Imahori | ................... | G02B 5/18 345/7 |
| 8,760,766 B2* | 6/2014 | Fujikawa | ........... | G02B 27/0101 359/630 |
| 9,417,451 B2* | 8/2016 | Ando | ................. | G02B 27/0101 |
| 9,753,283 B2* | 9/2017 | Nambara | ............... | B60K 35/00 |
| 9,958,677 B2* | 5/2018 | Kuzuhara | .......... | G02B 27/0101 |
| 10,025,095 B2* | 7/2018 | Asai | ....................... | B60K 35/00 |
| 10,036,890 B2* | 7/2018 | Yamaoka | ............... | B60K 35/00 |
| 2018/0015876 A1* | 1/2018 | Yamagata | ............... | B60Q 3/12 |

\* cited by examiner

*Primary Examiner* — William C. Dowling
(74) *Attorney, Agent, or Firm* — Che-Yang Chen; Law Offices of Scott Warmuth

(57) ABSTRACT

The structure of the present invention majorly includes: an outer shell body; at least one connection portion; and an optical projection system set inside the outer shell body. The optical projection system includes: an imaging unit; a reflector; a reflective curved mirror; and at least one optical lens; wherein the imaging unit projects the predefined image and incidents on the reflective curved mirror after being reflected by the reflector to adjust the imaging path and correct the aberration. And, the optical lens will magnify the predefined image in the imaging path to make the predefined image reflected to the user's eyes through the windshield to form the virtual image of the predefined image refracted outside the windshield. The present invention can realize the triangle imaging principle in a smaller space, enlarge the imaging range, reduce the aberration problem, and simply set outside the dashboard through the outer shell body.

8 Claims, 8 Drawing Sheets

OPTICAL PROJECTION SYSTEM AND DEVICES THEREOF

TECHNICAL FIELD OF THE INVENTION

The present invention relates to an optical projection system and the devices thereof, which combines a Head Up Display (HUD) having a simple structure, a smaller volume, the ability to virtually image at a long-distance, and a smaller image aberration into a detachable outer shell body to have the convenience for the after-assembly market.

DESCRIPTION OF THE PRIOR ART

As shown in FIG. 1, which is the implementation schematic diagram of the conventional Head Up Display (HUD). The HUD includes a box body 91, a display device 92, and at least two optical mirrors 93, 94. The driver can watch the virtual image of the image information through the windshield 95.

Wherein, the two-dimensional image is projected out by the box body 91 in a certain Field Of View (F.O.V), so the box body 91 is necessary to have a certain volume for projecting the image onto the windshield 95 through the optical mirrors 93, 94 and the box body 91 have to be set in front of the driver seat.

If not wanting to sacrifice the car prospects, the box body 91 have to be assembled and set in the dashboard before the car leaves the factory. And, the assembly and setting are difficult because the optical route is perpendicular, and the box body 91 is bulky and thick.

If wanting to decrease the volume or to thin the whole body, three problems of optical design including the magnification of the virtual image, the angle of view, and the aberration will be confronted with.

To implement the long-distance virtual image HUD, a virtual image magnification optical system, the Relay Optics, set in the rear end is needed to be applied together when using the micro projector or the Liquid Crystal Display (LCD) as the display device. Nevertheless, the design of the virtual image magnification system is not easy, which cannot effectively eliminate the aberration for the big angle of view and the displayed information will be reduced for the small angle of view, and therefore limits the application efficacy of the HUD. Besides, the windshield has an irregular curved surface that will result in the deformation and aberration of the image when the image reflects to the eyes, and they are very difficult to eliminate. Furthermore, the mirror must has an aspherical surface with a large area or it needs to add other additional lenses to solve the aberration problem, which will increase the manufacturing cost of the components and the assembly difficulty of the production.

Consequently, the popularity rate of installing the HUD in a car has been unable to upgrade presently.

SUMMARY OF THE INVENTION

The main objectives of the present invention include: utilizing the combination of the reflector, the reflective curved mirror, and the optical lens to achieve the long-distance virtual imaging in a triangle imaging technique, so as to reduce the necessary volume of the lens; and combining the optical projection system into an outer shell body, so as to endow the after-assembly convenience and rapidness to connect outside the dashboard.

The present invention majorly includes: an outer shell body; at least one connection portion set at one side of the outer shell body to provide the outer shell body for being set at the outer side of a dashboard detachably; an imaging unit set on the outer shell body to project at least one predefined image; a reflector set inside the outer shell body and located at one side of the imaging unit to receive and reflect the predefined image; a reflective curved mirror set inside the outer shell body and located in the reflective path of the reflector to provide for adjusting the imaging path, reducing the virtual image aberration, and projecting the predefined image on a windshield and furthermore reflecting to the user's eyes; wherein the virtual image is imaged at the outer side of the windshield; and at least one optical lens set on the outer shell body and located in the imaging path to magnify the predefined image.

When the user utilizes the present invention as a HUD, the imaging unit projects the predefined image and incidents on the reflective curved mirror after being reflected by the reflector to adjust the imaging path and correct the aberration. And, the optical lens will magnify the predefined image in the imaging path to make the predefined image reflected to the user's eyes through the windshield to form the virtual image of the predefined image refracted outside the windshield. Whereby, the present invention can realize the principle of the triangle imaging in a smaller space, enlarge the imaging range, and reduce the aberration problem. Therefore, the present invention has the convenience and development possibility for the after-assembly market through simply assembling and setting the outer shell body outside the dashboard.

Consequently, the present invention can solve the problems of the conventional HUD, which includes: it's bulky; it has smaller angle of view for image; it's easy to appear the image aberration; it has complexed structure design; and it's inconvenient to assemble with a car, such that the present invention can achieve the aforementioned improvements and progresses.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

Figure 1:
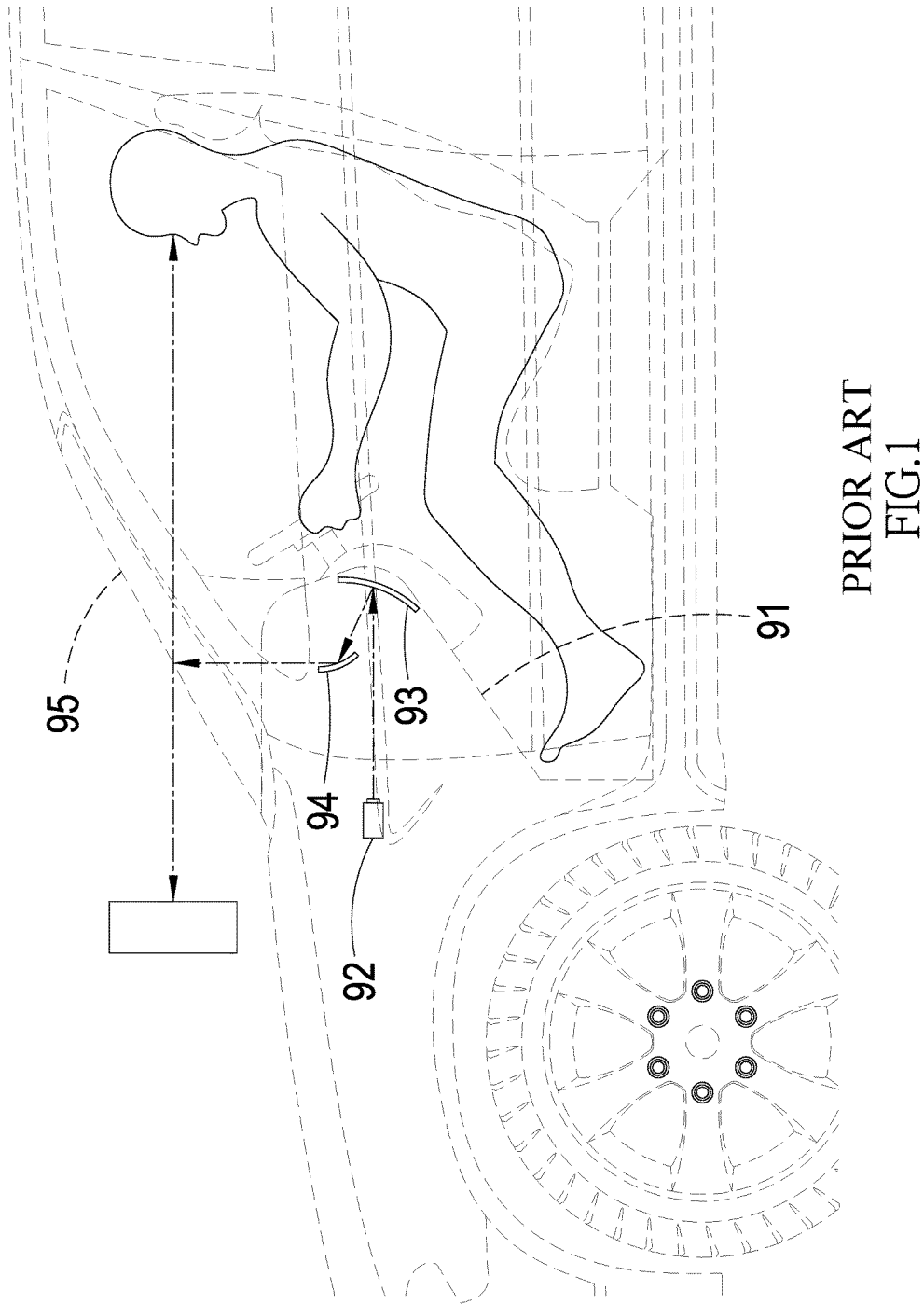
FIG. 1 is an implementation schematic diagram of a conventional HUD.
Figure 2:
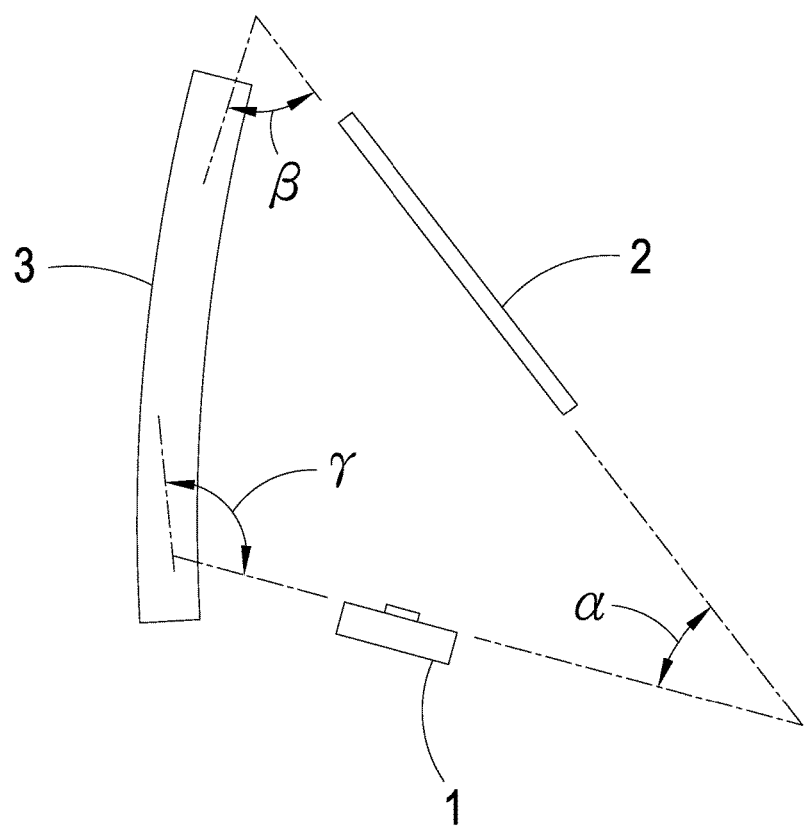
FIG. 2 is a relationship diagram of the mirror position according to the present invention.
Figure 3:
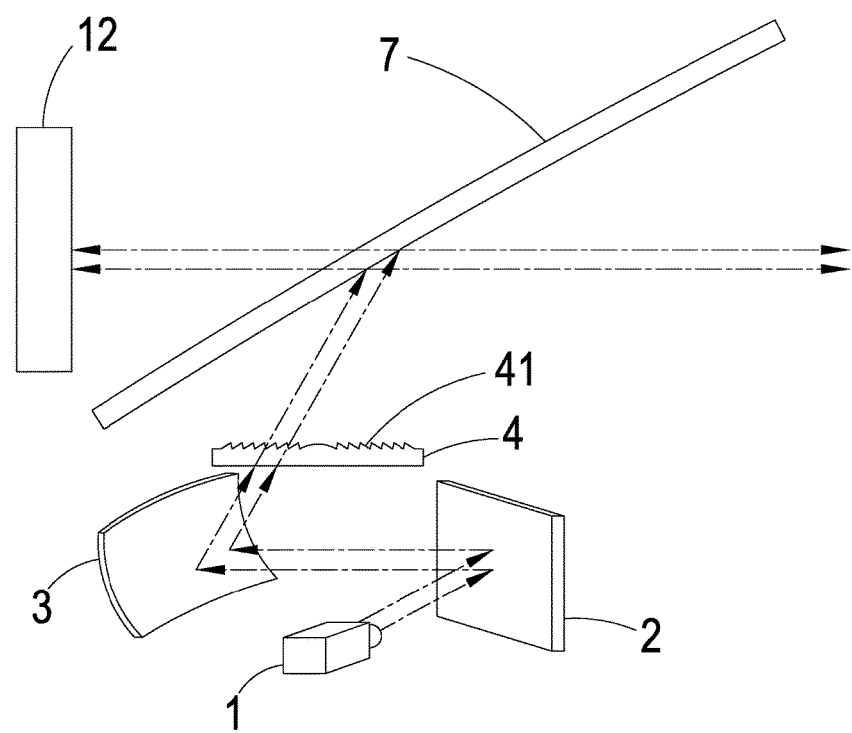
FIG. 3 is a schematic diagram of the imaging path according to the present invention.

As shown in FIG. 2 and FIG. 3, the present invention includes: an imaging unit 1 to project at least one predefined image 12; a reflector 2 to receive and reflect the predefined image 12; a reflective curved mirror 3 set at one side of the imaging unit 1 and located in the reflective path of the reflector 2 to provide for adjusting the imaging path, reducing the virtual image aberration, and projecting the predefined image 12 on a windshield 7 and furthermore reflecting to the user's eyes. The virtual image 12 is imaged at the outer side of the windshield 7, and the reflective curved mirror 3 comprises a plurality of curvatures which are defined by a mathematical equation; and at least one optical lens 4 set in the imaging path to magnify the predefined image 12, which the optical lens 4 is a Fresnel lens with a protective layer 41 on it; wherein a first angle α is defined between the imaging unit 1 and the reflector 2, and a second angle β is defined between the reflector 2 and the reflective curved mirror 3, and a third angle γ is defined between the imaging unit 1 and the reflective curved mirror 3; wherein the first angle α is 15 to 70 degrees, the second angle β is 30 to 90 degrees, and the third angle γ is 75 to 140 degrees; which the optimum values of the first angle α, second angle β, and third angle γ are respectively 30 to 40 degrees, 50 to 60 degrees, and 95 to 105 degrees.

The optical projection system of the present invention is majorly constituted by the imaging unit 1, the reflector 2 which is a plane mirror or a convex mirror, the reflective curved mirror 3, the optical lens 4 which is preferably a Fresnel lens, or can be a convex lens or some kind of the optical transparent thin material to cooperate with the windshield 7 to produce a long-distance virtual image; wherein the imaging unit 1, the reflector 2, and the reflective curved mirror 3 are located at the same horizontal plane. Therefore, the predefined image 12 is preferably projected on the reflector 2 laterally in parallel light. And, the free curvature of the reflective curved mirror 3 is applied to change the path of the reflective light to emit upwardly, whereby the imaging path will gain the upward vertical component from the reflective curved mirror 3.

The objective of aberration correction is simultaneously achieved, and the dust-proof function is also attained because the optical lens 4 with a protection layer 41 may be directly set in the hollow place of the outer shell body 1 which can avoid that the extra light transmission material such as the plastic, glass, and acrylic . . . , etc. to affect the imaging effect.

Because the reflective curved mirror 3 comprises a plurality of curvatures which may cooperate with the divergence distance and the angle of the reflector 2 to do a complete aberration correction, the curvature of the reflective curved mirror 3 is non-fixed.

Through a precise calculation may derive a mathematical equation to manufacture this kind of reflective curved mirror 3 with the special curvature design, which the mathematical equation is shown below:

$$z = \frac{cr^2}{1+\sqrt{1-(1+k)c^2r^2}} + \sum_{i=1}^{N} A_i E_i(x,y)$$

Wherein, $$\sum_{i=1}^{N} A_i E_i(x,y) = A_1 x + A_2 y + A_3 xy + A_4 x^2 + A_5 xy + A_6 y^2 + A_7 x^3 + A_8 x^2 y + \ldots,$$

$A_i$ is a natural number, i=1, 2, 3, . . . , z is the mirror depth (seg), r is the vertical height from any point on the mirror to the optical axis and is the curvature of the mirror center.

$$r = \sqrt{x^2 + y^2}$$

And, k is the constant value of the quadratic surface.

The predefined image 12 is preliminarily magnified by the reflective curved mirror 3, and its imaging path is diverted. And then, the predefined image 12 is projected on the windshield 7 via the magnification effect of the optical lens 4. The predefined image 12 is reflected to the eyes of the user by the windshield 7, and is refracted to form a virtual image of the predefined image 12 in front of the user about two meters away.

Such that, the long-distance virtual imaging can be achieved by applying the aforementioned structure, which integrates the allocation of the first angle α, second angle β, and the third angle γ to form a triangle imaging technique. Besides, the necessary volume of the lens can be effectively reduced and the aberration problem can be simultaneously overcome because the optical lens 4 is a Fresnel lens.

Figure 4:
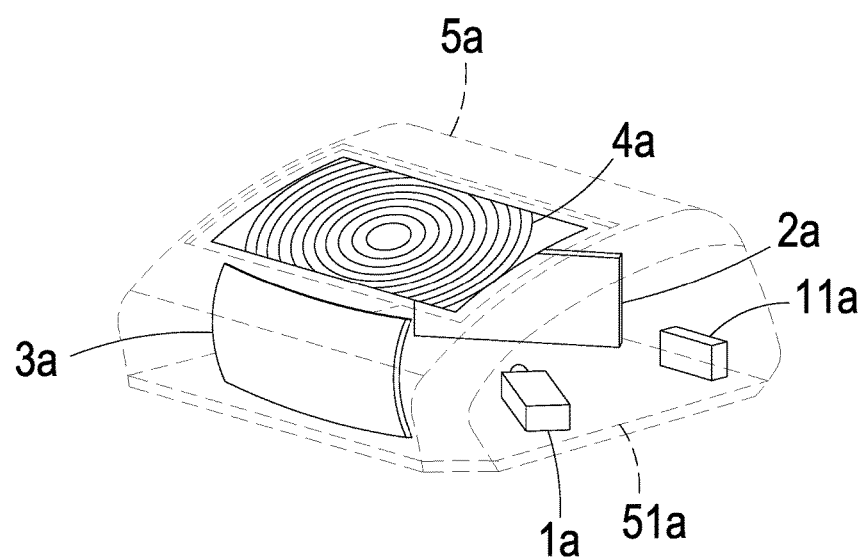
FIG. 4 is another three-dimensional perspective view according to the present invention.
Figure 5:
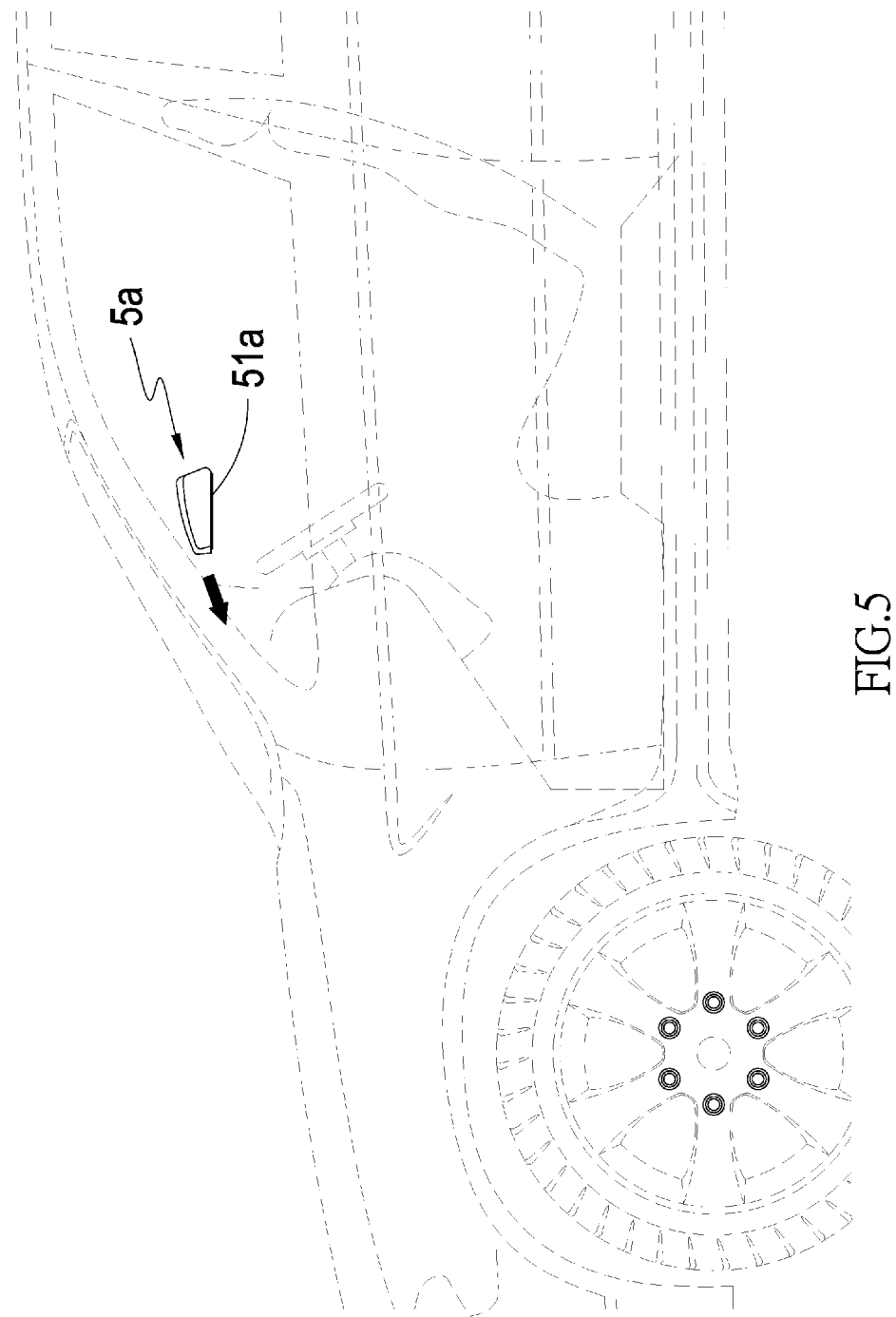
FIG. 5 is another assembly schematic diagram according to the present invention.
Figure 6:
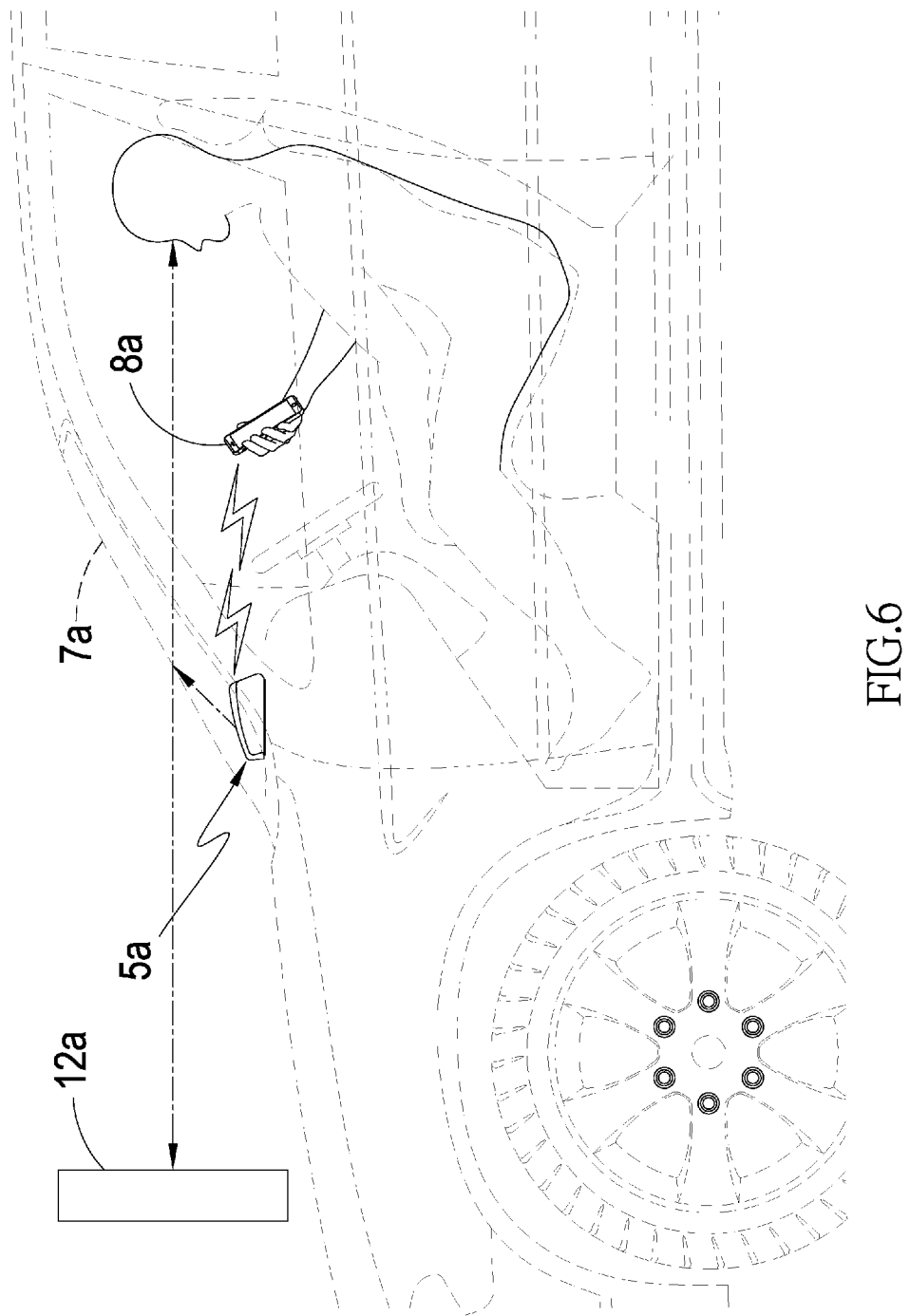
FIG. 6 is another implementation schematic diagram according to the present invention.

As shown in FIG. 4 to FIG. 6, the aforementioned optical projection system is set in an outer shell body 5a according to this embodiment of the present invention, wherein at least one connection portion 51a is set at one side of the outer shell body 5a to provide the outer shell body 5a for being set at the outer side of a dashboard detachably, wherein the imaging unit 1a is set on the outer shell body 5a, which the reflector 2a and the reflective curved mirror 3a is set inside the outer shell body 5a. The optical lens 4a is set in the viewable range above the top surface of the outer shell body 5a, and a wireless connection module 11a electrically connected with the imaging unit 1a is set inside the outer shell body 5a to provide for wirelessly connecting with an electronic device 8a to receive the predefined image 12a wirelessly and transmit to the imaging unit 1a. Whereby, the wireless connection module 11a can be firmly connected in the outer shell body 5a because the aforementioned optical projection technique can reduce the necessary volume of the lens including the size itself and the space among the lenses. And, the outer shell body 5a cooperated with the connection portion 51a can be easily set at the outer side of the dashboard by the user without the help of a professional or the need of being pre-embedded in front of the driver seat before the car leaves the factory. Therefore, it has the convenience of the after-assembly market.

Wherein, the connection portion 51a may be a slip resistant structure, a paste structure, or a fixed position structure such as being extendedly fixed at the front edge of the dashboard or the wind outlet at one side of the windshield.

Figure 7:
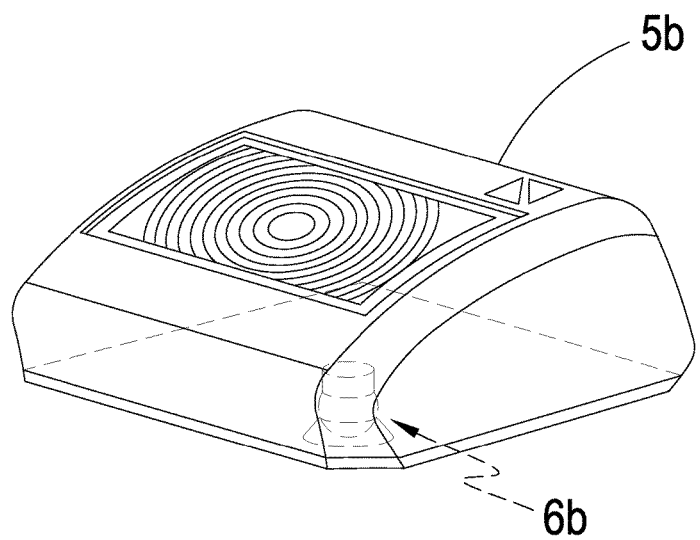
FIG. 7 is another structure schematic diagram according to the present invention.

As shown in FIG. 7, this embodiment of the present invention is almost the same with the previous embodiment, at least one angle adjustment device 6b is additionally set on the outer shell body 5b to provide for altering the projected angle of the imaging path leaving from the outer shell body 5b; wherein the angle adjustment device 6b is a universal adjustment element which can be set outside the outer shell body 5b to provide the user to manually adjust the outer shell body 5b directly for properly adjusting the final imaging effect.

Figure 8:
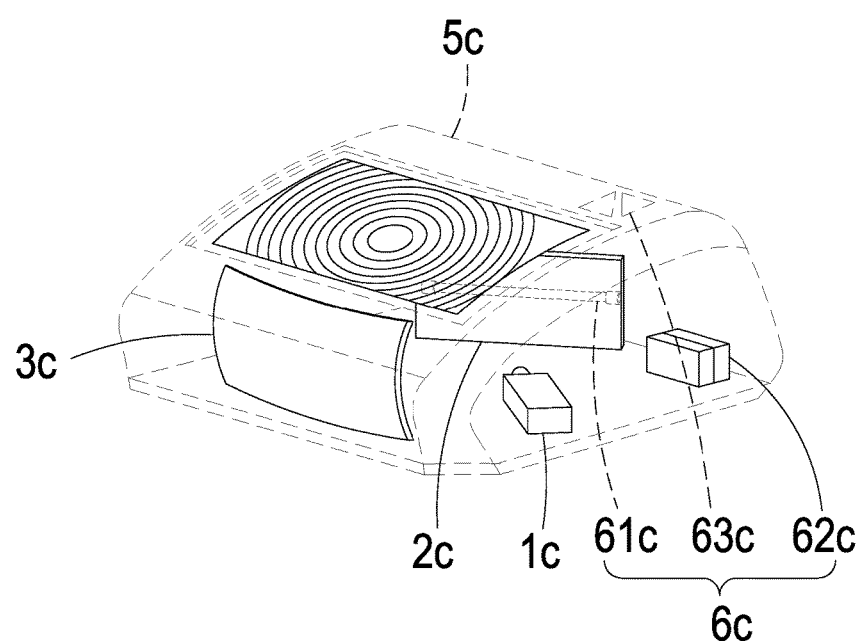
FIG. 8 is another structure schematic diagram according to the present invention.

As shown in FIG. 8, this embodiment of the present invention is almost the same with the previous embodiment, the angle adjustment device 6c further includes at least one driving element 61c, a memory unit 62c provided for recording the angle parameters, and an operation module 63c set on the outer shell body 5c and electrically connected to the driving element 61c and the memory unit 62c for selecting the angle parameters to set up the driving element 61c.

Thereby, the user may set up different imaging angles by using the angle adjustment device 6c according to different models of cars or different angles of the windshield. When in the practical operation, the operation module 63c on the outer shell body 5c can be utilized to select the pre-stored angle parameter combination to automatically control the angle and position relationships of the imaging unit 1c, the reflector 2c, and the reflective curved mirror 3c to meet the versatile models of cars.

I claim:

1. An optical projection system, comprising:
   an imaging unit to project at least one predefined image;
   a reflector to receive and reflect the predefined image;
   a reflective curved mirror set at one side of the imaging unit and located in the reflective path of the reflector to provide for adjusting the imaging path, reducing the virtual image aberration, and projecting the predefined image on a windshield and furthermore reflecting to the user's eyes; wherein the virtual image is imaged at the outer side of the windshield; and
   at least one optical lens set in the imaging path to magnify the predefined image;
   wherein a first angle is defined between the imaging unit and the reflector, and a second angle is defined between the reflector and the reflective curved mirror, and a third angle is defined between the imaging unit and the reflective curved mirror; wherein the first angle is 15 to 70 degrees, the second angle is 30 to 90 degrees, and the third angle is 75 to 140 degrees.

2. The optical projection system according to claim 1, wherein the optical lens is a Fresnel lens.

3. The optical projection system according to claim 1, wherein the optical lens has a protective layer on it.

4. The optical projection system according to claim 1, wherein the reflective curved mirror comprises a plurality of curvatures which are defined by a mathematical equation.

5. The optical projection system according to claim 1, wherein the optimum value of the first angle is 30 to 40 degrees, the optimum value of the second angle is 50 to 60 degrees, and the optimum value of the third angle is 95 to 105 degrees.

6. An optical projection system, comprising:
   an imaging unit to project at least one predefined image;
   a reflector to receive and reflect the predefined image;
   a reflective curved mirror set at one side of the imaging unit and located in the reflective path of the reflector to provide for adjusting the imaging path, reducing the virtual image aberration, and projecting the predefined image on a windshield and furthermore reflecting to the user's eyes; wherein the virtual image is imaged at the outer side of the windshield; and
   at least one optical lens set in the imaging path to magnify the predefined image;
   wherein the imaging unit, the reflector, and the reflective curved mirror are located at the same horizontal plane to make the imaging path gain a vertical component only from the reflective curved mirror.

7. An optical projection system, comprising:
   an outer shell body;
   at least one connection portion set at one side of the outer shell body to provide the outer shell body for being set at the outer side of a dashboard detachably;
   an imaging unit set on the outer shell body to project at least one predefined image;
   a reflector set inside the outer shell body and located at one side of the imaging unit to receive and reflect the predefined image;
   a reflective curved mirror set inside the outer shell body and located in the reflective path of the reflector to provide for adjusting the imaging path, reducing the virtual image aberration, and projecting the predefined image on a windshield and furthermore reflecting to the user's eyes; wherein the virtual image is imaged at the outer side of the windshield; and
   at least one optical lens set on the outer shell body and located in the imaging path to magnify the predefined image;
   wherein at least one angle adjustment device is set on the outer shell body to provide for altering the projected angle of the imaging path leaving from the outer shell body.

8. The optical projection system according to claim 7, wherein a wireless connection module electrically connected with the imaging unit is set inside the outer shell body to provide to receive the predefined image and transmit to the imaging unit.

* * * * *